3,127,419
MALEIC ANHYDRIDE COMPOSITION AND
METHOD OF MAKING THE SAME
Manfred Gans, Leonia, N.J., assignor to Halcon
International, Inc., a corporation of Delaware
No Drawing. Filed Nov. 15, 1960, Ser. No. 69,254
2 Claims. (Cl. 260—346.8)

This application relates to a specification grade solid maleic anhydride product in dust-free particulate form containing a small amount of flaking agent, and also to processes for converting such a material from the liquid form to the particulate, solid form by flaking, and more particularly it relates to such a product and process wherein the flaking agent is itaconic anhydride.

Maleic anhydride is a commercially important material and for many purposes it is packaged and shipped in free-flowing, solid, form such as flakes or the flakes may be converted to briquettes. Specification grade maleic anhydride may contain a small amount or trace of maleic acid as well as of xylene or the like azeotroping agent, and such material tends to form powder or dust when the molten material is flaked in a conventional manner. Such dust is particularly bothersome from the manufacturing viewpoint (requiring costly shut-down for cleaning out), gives rise to health hazards, and also increases losses due to evaporation from the relatively extensive surface thereof. The art is confronted by the problem of providing substantially dust-free specification grade maleic anhydride in free-flowing, solid or particulate form, as well as methods for producing such a product in a convenient and economic manner.

The discoveries associated with the invention and relating the solutions of the above problems, and the objects achieved in accordance with the invention as set forth herein include the provision of:

A specification grade maleic anhydride product in dust-free, solid, particulate form containing itaconic anhydride as a flaking agent, the amount of the flaking agent being insufficient to render the composition off-grade and yet sufficient to permit converting the molten material to the desired form by flaking without dusting;

A method for producing specification grade maleic anhydride product in dust free solid particulate form which comprises flaking molten maleic anhydride containing itaconic anhydride as a flaking agent, the amount of the flaking agent being insufficient to render the composition off-grade and yet sufficient to permit converting the molten material to the desired form by flaking, without dusting;

Such a method or product wherein the amount of flaking agent is in the range of 0.1 to 0.25 weight percent;

Such a method or product wherein the product contains a small amount of xylene;

Such a method or product wherein the product contains small amount of maleic acid;

Such a method wherein the flaking drum is rotated at a speed of 8 to 12 rotations per minute;

Such a method wherein the molten material is maintained at a temperature in the range of 53° as to 60° C.;

Such a method wherein the cooling medium in the flaking drum is at a temperature in the range of 16° to 28° C.;

And other objects which will be apparent as details or embodiments of the invention are set forth hereinafter.

In order to indicate still more fully the nature of the present invention, the following examples of typical procedures are set forth in which parts and percent mean part and percent by weight, respectively, unless otherwise indicated, it being understood that these examples are presented as illustrative only and are not intended to limit the scope of the invention.

The following runs are carried out by converting the molten material into flake form by applying the material in a thin layer to a revolving drum on which the material cools, solidifies and is removed in flake form by a stationary knife. The apparatus used includes a revolving drum cooled by water which drum dips in a shallow heated pan filled with the molten material. A knife or doctor against the drum removes the product from the surface in solid form.

The charge of maleic anhydride is brought to a temperature of about 58° C. and the cooled rotating drum is brought into the pan. The interior of the drum is cooled by means of water at 16° to 28° C. The following results are obtained using a 5 inch diameter drum.

*Example I*

High purity maleic anhydride (M.P. of about 52.6° C.) is melted together with 0.1 wt. percent thereof of itaconic anhydride and the mixture is flaked using a drum speed of 10 r.p.m. The product obtained is oblong in form with the majority of the particles of ¼ inch to ½ inch in length about 3/16 inch in width and about 12-thousandths of an inch thick. This product is dust free and does not tend to cake up on standing.

*Comparative Example A*

In a comparative run, except using no additive, undesirably small flakes about one-quarter or less, the size of those of Example I are obtained with considerable dust. Upon standing the product tends to cake readily.

The procedure of the invention gives specification grade product in large particulate form which is free-flowing and dust-free, as illustrated in Example I. On the other hand, the comparative run without the additive produces unsatisfactory particles and an undesirable amount of dust.

These runs are repeated with specification grade maleic anhydride containing a trace of xylene and comparable results to Example I are obtained with the additive; on the other hand, if no additive is present most of the product is in the form of a fine troublesome dust.

The maleic anhydride starting material as well as the product is of specification grade, and this grade is defined as:

M.P. _____ 52.4°–52.8° C.
Color (Hazen) _____ 20 or less (for the molten material).
5% xylene solution _____ Clear.
Purity _____ 99.5% minimum.

The standard used to indicate the quantity or intensity of color of the products in molten or liquid form is known as the A.P.H.A. standard color test. This test is one developed by the American Public Health Association which is known as the Hazen platinum-cobalt scale a description of which is found on page 2048 of the 5th edition of "Standard Methods of Chemical Analysis," by Wilford W. Scott.

The flaking agent is added as a solid or liquid before the melt is flaked.

Comparable results to the foregoing are achieved with various modifications thereof, including the following.

The flaking may be carried out on large commercial type apparatus which may be of a diameter of 3 to 4 feet, and this gives relatively larger flakes, if dust free material is obtained with the small diameter apparatus.

The amount of flaking agent is insufficient to render the composition off-grade; however, it is sufficient to permit converting the molten material to the desired form by flaking, without dusting. In the absence of the flaking agent, the starting material tends to dust and gives particles of an undesirably small size. The preferred amount of flaking agent is the minimum required to attain the desired flaking effect, and generally an amount of 0.1 and 0.25 weight percent is effective. These amounts are calculated as the anhydride, although some may be present as itaconic acid.

The initial or starting maleic anhydride may contain a small amount of xylene or the like azeotroping agent and it may contain a small amount of maleic acid.

The flaking operation is conducted with the melt at a temperature in the range of about 53° to 60° C., preferably about 55° to 58° C. The cooling medium in the flaking drum may be at a temperature in the range of 16° to 28° C. The flaking drum is preferably rotated at a speed of 8 to 12 rotations per minute for the small drum. Lower speeds give too small particles, and higher speeds give too small and thin particles.

These results are indeed surprising in view of the many unsatisfactory materials tested.

In view of the foregoing disclosures, variations and modifications thereof will be apparent to one skilled in the art and it is intended to include within the invention all such variations and modifications except as do not come within the scope of the appended claims.

What is claimed is:

1. A substantially dust-free flaked composition consisting essentially of: at least 99.5 wt. percent maleic anhydride and at least 0.1 wt. percent itaconic anhydride.
2. The composition of claim 1 wherein the amount of flaking agent is in the range of 0.1 to 0.25 weight percent.

References Cited in the file of this patent

UNITED STATES PATENTS 2,770,630    Miller  ---------------- Nov. 13, 1956

OTHER REFERENCES

Riegel: Industrial Chemistry (Fifth Edition, 1949), page 876, TP 145. R54.